United States Patent
Borate et al.

(10) Patent No.: US 10,133,745 B2
(45) Date of Patent: Nov. 20, 2018

(54) ACTIVE REPARTITIONING IN A DISTRIBUTED DATABASE

(71) Applicant: Druva Technologies Pte. Ltd., Singapore (SG)

(72) Inventors: Milind Borate, Pune (IN); Trimbak Bardale, Dist Parbhani (IN); Srikiran Gottipati, Vijayawada (IN)

(73) Assignee: DRUVA TECHNOLOGIES PTE. LTD., Singapore (SG)

( * ) Notice: Subject to any disclaimer, the term of this patent is extended or adjusted under 35 U.S.C. 154(b) by 378 days.

(21) Appl. No.: 15/058,779

(22) Filed: Mar. 2, 2016

(65) Prior Publication Data

US 2017/0177601 A1    Jun. 22, 2017

(30) Foreign Application Priority Data

Dec. 17, 2015 (IN) .......................... 6752/CHE/2015

(51) Int. Cl.
*G06F 17/30* (2006.01)
*H04L 29/08* (2006.01)

(52) U.S. Cl.
CPC .. *G06F 17/30117* (2013.01); *G06F 17/30321* (2013.01); *G06F 17/30486* (2013.01); *G06F 17/30584* (2013.01); *H04L 67/02* (2013.01); *H04L 67/06* (2013.01); *H04L 67/1002* (2013.01); *H04L 67/2842* (2013.01)

(58) Field of Classification Search
None
See application file for complete search history.

(56) References Cited

U.S. PATENT DOCUMENTS

| | | | | |
|---|---|---|---|---|
| 8,392,482 | B1 * | 3/2013 | McAlister | G06F 17/30584 707/899 |
| 8,433,771 | B1 * | 4/2013 | Ellsworth | H04L 67/125 709/213 |
| 8,510,538 | B1 * | 8/2013 | Malewicz | G06F 7/38 712/225 |
| 9,697,274 | B2 * | 7/2017 | Balmin | G06F 17/30536 |
| 9,916,344 | B2 * | 3/2018 | Levitan | G06F 17/30533 |
| 9,996,573 | B1 * | 6/2018 | Vig | G06F 17/30584 |
| 2008/0005736 | A1 * | 1/2008 | Apacible | G06F 9/4843 718/100 |

(Continued)

*Primary Examiner* — Richard L Bowen
(74) *Attorney, Agent, or Firm* — Fenwick & West LLP (57) ABSTRACT

Disclosed embodiments include a method (system and non-transitory computer storage readable medium) for load-balancing a distributed database. The distributed database includes one or more storage machines configured to store a plurality of partitions, where each partition includes key-value pairs. In one embodiment, the distributed database prepares for load-balancing by determining a partition to redistribute (or repartition) and generating smaller partitions of the determined partition. In one aspect, each of the smaller partitions is smaller than the determined partition. The redistribution of the partition can occur, when an amount of requests to access one or more key-value pairs stored in the database increases beyond a predetermined request level or when the size of a partition exceeds a predetermined size. Key-value pairs of the determined partition can be split into different sets of key-value pairs, and each set of key-value pair is copied to a corresponding smaller partition.

18 Claims, 5 Drawing Sheets

(56) References Cited

U.S. PATENT DOCUMENTS

| | | | |
|---|---|---|---|
| 2009/0063396 A1* | 3/2009 | Gangarapu | G06F 17/30321 |
| 2012/0109892 A1* | 5/2012 | Novik | G06F 17/30566 707/633 |
| 2016/0055192 A1* | 2/2016 | Bensberg | G06F 17/30339 707/755 |
| 2017/0039232 A1* | 2/2017 | Jayanth | G06F 17/30345 |

* cited by examiner

ACTIVE REPARTITIONING IN A DISTRIBUTED DATABASE

CROSS-REFERENCE TO RELATED APPLICATION

This application claims a benefit of, and priority to, India Patent Application No. 6752/CHE/2015, filed Dec. 17, 2015, the content of which is incorporated by reference in its entirety.

BACKGROUND

1. Field Art

The disclosure generally relates to the field of data storage, and in particular to, partitioning of the data storage.

2. Background Information

As computers, smart phones, tablets, laptops, servers, and other electronic devices increase in performance year to year, the amount of data they generate also increases. Many conventional relational database systems such as MYSQL or SQL SERVER fail to scale economically and efficiently. Particularly, the relational database system suffers from long search latency and reliability issues, when the amount of data grows into the range of hundreds of Terabytes or even Petabytes.

A distributed database system (herein also referred to as "NoSQL database system") offers a performance advantage over the conventional relational database system by distributing contents over multiple storage machines. In one example, data is stored in a form of key-value pairs in the NoSQL database system, where the values are binary tree indexed by the keys for faster data retrieval than in the relational database system. Moreover, scalability can be improved by partitioning data and storage reliability can be improved by storing multiple copies of the same partitions at different storage machines. The amount of storage of the distributed database can be easily increased by adding a new storage machine to the existing machines and distributing a portion of one or more partitions of the content to the new storage machine.

In a conventional distributed database, when the existing storage machines serving the database are overloaded, new storage machines are added to increase the capacity. Adding the new storage machine involves load-balancing or redistributing of existing partitions. Specifically, load-balancing includes scanning the existing partitions, maintaining some keys on the existing storage machines and transferring the rest to the new storage machine. Transferring a key-value pair of a large partition (e.g., 10 Gigabytes) at a time for a partition is a time consuming process (e.g., 20 hours). Moreover, the new storage machine is not functional until all the key-value pairs of a new partition are transferred to the new storage machine. The distributed database cannot serve new requests to read, add, delete or modify data from the new machine, until the redistribution of the existing partitions is completed. Hence, the existing storage machines continue to be overloaded during the load-balancing. The existing storage machines are further overloaded due to the load-balancing activity.

Accordingly, the conventional database is inefficient in terms of latency involved for serving new requests received during the load-balancing.

BRIEF DESCRIPTION OF THE DRAWINGS

Figure (FIG.) 1 illustrates a storage environment, respectively, in accordance with an embodiment.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Example embodiments of disclosed configurations include a method (system and non-transitory computer storage readable medium) for load-balancing a distributed database. In one example, the distributed database includes one or more storage machines configured to store a plurality of partitions, where each partition includes key-value pairs. In one embodiment, the distributed database prepares for load-balancing by determining a partition to redistribute (or repartition) and generating smaller partitions of the determined partition. In one aspect, each of the smaller partitions is smaller than the determined partition. The redistribution of the partition can occur, when an amount of requests to access one or more key-value pairs stored in the database increases beyond a predetermined request level or when the size of a partition exceeds a predetermined size. Key-value pairs of the determined partition can be split into different sets of key-value pairs, and each set of key-value pair is copied to a corresponding smaller partition. Hence, the determined partition can be used for serving a request to access a key-value pair during the redistribution. The determined partition can be removed, after all the key-value pairs of the determined partition are copied to the respective smaller partitions. In this approach, sizes of the partitions stored in the distributed database are maintained below a predetermined storage level. Hence, load-balancing can be performed efficiently by redistributing one or more partitions prior to performing load-balancing. In one aspect, one or more new storage machines can be attached to the existing one or more storage machines and some of the smaller partitions can be transferred to the one or more new storage machines in a time efficient manner compared to transferring key-value pairs individually.

System Overview

Figure 1:
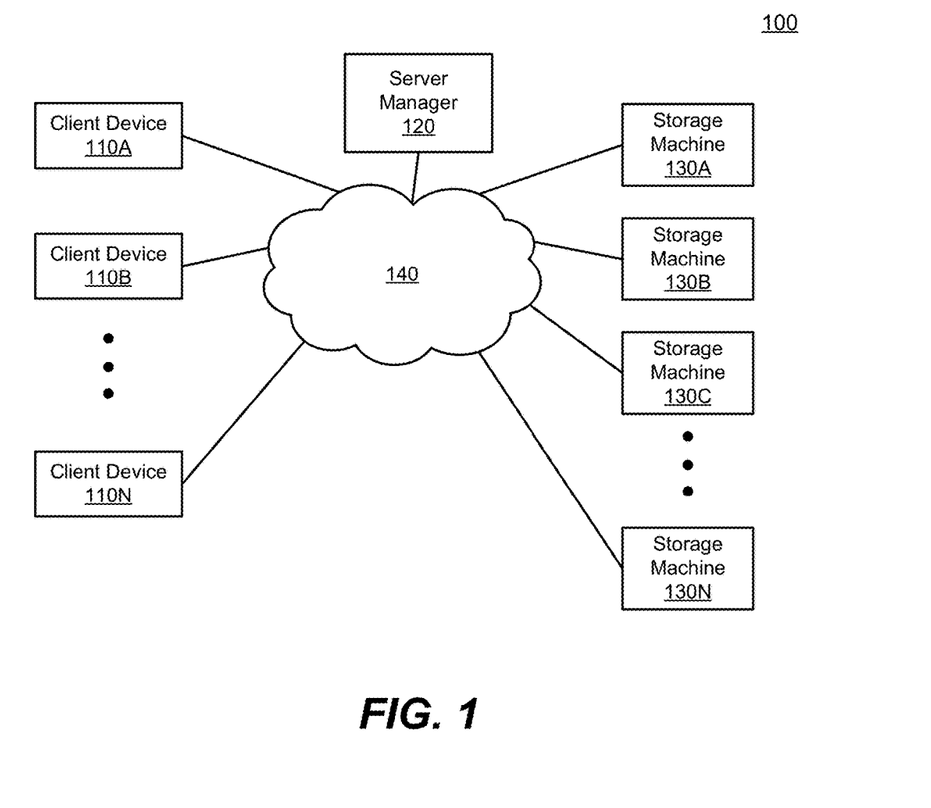

FIG. 1 illustrates one embodiment of a storage environment 100, which comprises a server manager 120 that provides data storage services to one or more client devices 110A, 110B . . . 110N (generally herein referred to as "client devices 110") over a network 140 through one or more storage machines 130A, 130B . . . 130N (generally herein referred to as "servers 130"). A client device 110 may send a request to read, add, delete, or modify data to the server manager 120. Examples of data requested to be stored include, but are not limited to, a text file, an image file, an audio clip, a video clip, or any combination thereof. The client device 110 can be any computing device that has data that requires backup. Examples of such a device include a personal computer (PC), a desktop computer, a notebook, a tablet computer, or any other suitable electronic device. Examples also include a device executing an operating system, for example, a MICROSOFT WINDOWS-compatible operating system (OS), APPLE OS X or iOS, GOOGLE ANDROID and/or a LINUX distribution. The client device 110 can also be any device having computer functionality, such as a personal digital assistant (PDA), a mobile telephone, a smartphone, a device executing the APPLE iOS operating system, the GOOGLE ANDROID operating system, WINDOWS MOBILE operating system, or WEBOS operating system. Computer functionality and structure are described further in conjunction with FIG. 5. The client device 110 may also be a server device that requires backup, such as a web server (running for example APACHE), a file server, a database server, etc. Although such server devices may perform server functions in an organization, from the point of view of the server manager 120, they are treated like any other client device that requires data backup services.

The server manager 120 is a hardware component (e.g., computing machine of FIG. 5) that enables the client device 110A to store data in one or more storage machines 130 and access the stored data. The server manager 120 receives a request from the client device 110 to upload data for storage on the one or more storage machines 130, and then stores the requested data. Moreover, the server manager 120 retrieves data that has been stored previously on the one or more storage machines 130, in response to a request from the client device 110. The server manager 120 can determine a storage machine 130 associated with a client using a client device 110. In addition, the server manager 120 can determine to which storage machine 130 to store data or metadata. In one embodiment, the server manager 120 redistributes data or metadata in a manner that accommodates an incoming request to access data during the redistribution, as further described in conjunction with FIGS. 2, 3, and 4A through 4D. In one embodiment, the server manager 120 may be implemented using one or more computer servers that have a network communications capability. In another embodiment, the server manager 120 is implemented using cloud services such as AMAZON WEB SERVICES or MICROSOFT AZURE.

The interaction between the client device 110, the server manager 120, and the one or more storage machines 130 are typically performed via a network 140, for example, via the internet. The network 140 enables communications between the client device 110 and the server manager 120 as well as with the one or more storage machines 130. In one embodiment, the network 140 uses standard communications technologies and/or protocols. Thus, the network 140 can include links using technologies such as Ethernet, 802.11, worldwide interoperability for microwave access (Wi-MAX), 3G, digital subscriber line (DSL), asynchronous transfer mode (ATM), InfiniBand, PCI Express Advanced Switching, etc. Similarly, the networking protocols used on the network 140 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 140 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 140 can also include links to other networks such as the Internet.

Figure 2:
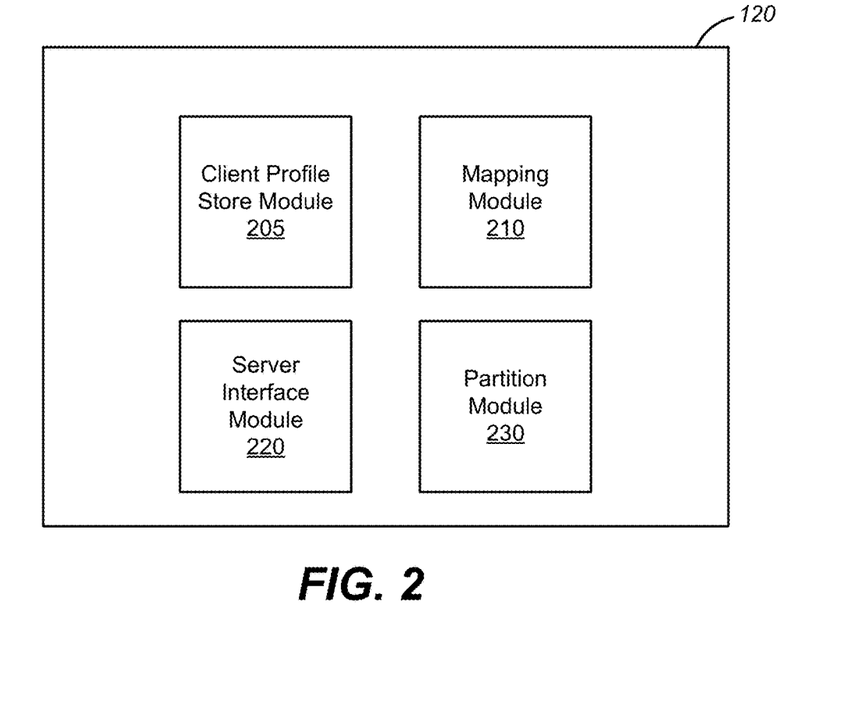
FIG. 2 illustrates a block diagram of a server manager in accordance with an embodiment.

FIG. 2 illustrates a block diagram of an embodiment of the server manager 120. The server manager 120 shown in FIG. 2 includes a client profile store module 205, a mapping module 210, a server interface module 220, and a partition module 230. In other embodiments, the server manager 120 may include additional, fewer, or different components for various applications. The server manager 120 can be implemented as a computing device as described in FIG. 5.

The server interface module 220 receives requests from one or more client devices 110 and executes the requests. Specifically, the server interface module 220 receives a request to store input data from the client device 110, and stores the input data at one or more storage machines 130. In one embodiment, the server interface module 220 splits the data from the client device 110 into one or more partitions and distributes the partitions to one or more storage machines 130, according to the mapping module 210. Each partition may comprise one or more key-value pairs. Moreover, the server interface module 220 receives a request from the storage machine 130 to read (or access) data stored at one or more storage machines 130; retrieves partitions associated with the requested data from the one or more storage machines 130 based on the mapping module 210; combines the retrieved partitions; and provides the combined partitions to the client device 110. Furthermore, the server interface module 220 receives, from the client device 110, a request to add, delete, or modify a specific data file, and the server interface module 220 identifies partitions corresponding to the data file and the client device 110 through the client profile store module 205 and the mapping module 210, and then executes the request. In one aspect, the client device 110 is neither aware of how the data is partitioned nor distributed, but rather recognizes the data is stored at a single storage machine 130. Detailed operations of the server manager 120 are described in detail with respect to FIGS. 3, and 4A through 4D below.

The client profile store module 205 stores identifications for client devices 110 and identifications of one or more storage machines 130 associated with a client device 110. In one example embodiment, the client profile store module 205 can be embodied as a look up table. As described in this example, a client device 110A may be associated with a plurality of storage machines 130, as shown in FIG. 1. The identification of the client device 110A and the plurality of storage machines 130 are stored in the client profile store module 205. For example, the identification of storage machines 130A and 130B can be stored with an association to the identification of the client device 110A. Through the client profile store module 205, the server interface module 220 can identify one or more storage machines e.g., storage machines 130A, 130B, associated with a client device, e.g., a client device 110A.

The mapping module 210 stores information describing how data are partitioned and storage machines 130 associated with each partition. In one embodiment, the mapping module 210 can be embodied as a look up table or a mapping function to map hash value of the key to the corresponding partition. Through the mapping module 210, the server interface module 220 can identify which data is associated with which partitions, and at which storage machine the partitions are stored. Although in FIG. 2 the client profile store module 205 and mapping module 210 are described as two separate modules, in other embodiments, the client profile store module 205 and the mapping module 210 may be combined into a single module.

The partition module 230 manages data stored in the one or more storage machines 130. The partition module 230 can receive input data from the client device 110, and split the input data into two or more partitions, or redistribute an existing set of partitions into a new set of partitions for load-balancing. The same partition may be stored at different storage machines 130 for fault tolerance. In one embodiment, the partition module 230 statistically determines a time period at which an amount of requests from the client devices 110 is below a predetermined request level for a predetermined duration (e.g., a day, a week, one or more months, etc.). During the determined time period, the partition module 230 can detect a large partition with a size exceeding a predetermined storage level (e.g., 1 Gigabyte), and split the large partition into one or more smaller partitions in terms of a storage level. The partition module 230 may update the mapping module 210 when the partition is performed. Additional details of a process of partitioning are described in below with respected to FIGS. 3, and 4A through 4D.

Figure 3:
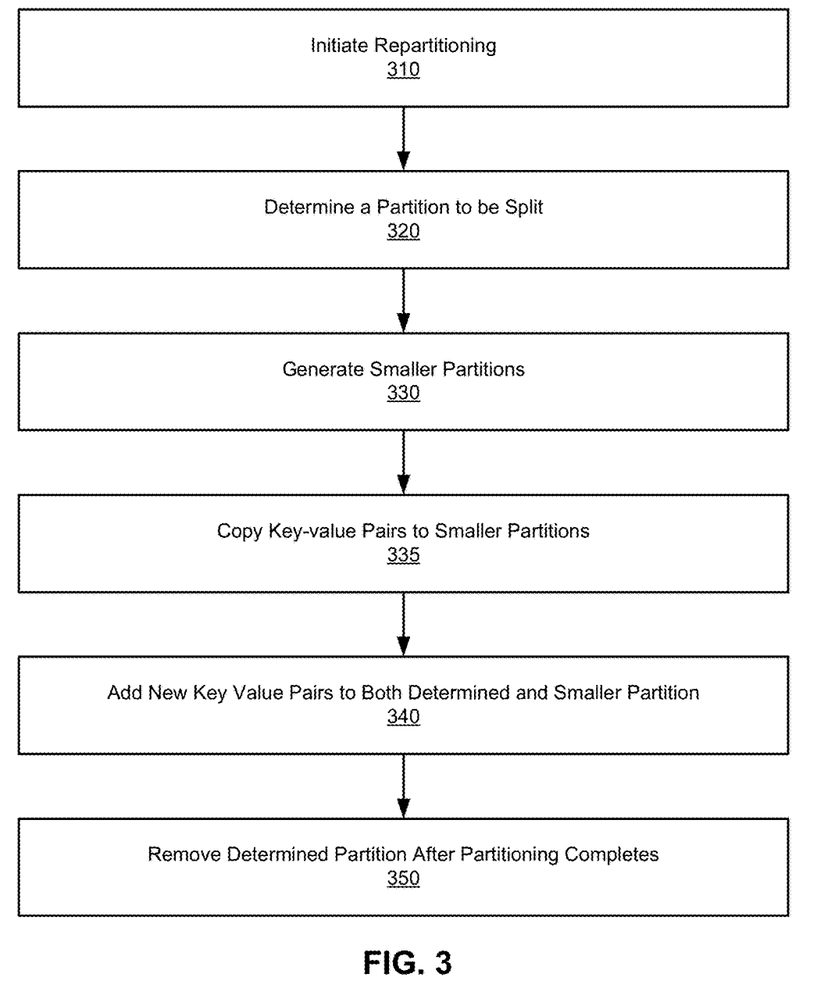
FIG. 3 is an example flow chart for performing repartitioning, in accordance with an embodiment.

Turning now to FIG. 3, it illustrates a flowchart of one embodiment of a method of performing repartitioning, performed by the server manager 120. In other embodiments, the method may include different and/or additional steps than those shown in FIG. 3. The functionality described in conjunction with the server manager 120 in FIG. 3 may be provided by the partition module 230 of the server manager 120, in one embodiment, or may be provided by any other suitable component, or components, in other embodiments. Additionally, the client device 110 may execute one or more instructions associated with the server manager 120, such as an application associated with the server manager 120, to provide the functionality described in conjunction with FIG. 3.

The server manager 120 initiates 310 repartitioning. In one approach, the server manager 120 statistically predicts a time period at which an amount of requests from the one or more client devices 110 is below a predetermined request level, and performs repartitioning during the predicted time period (a weekday or weekend at predetermined time e.g., Saturday at 2 A.M.).

The server manager 120 determines 320 a partition to be split. In one approach, the server manager 120 determines 320 a large partition with a size exceeding a predetermined storage level (e.g., 10 Gigabytes) during the determined time period.

The server manager 120 generates 330 smaller partitions (i.e., new partitions) based on the determined partition, where each of the smaller partitions is smaller than the determined partition in terms of a storage level. The server manager 120 splits key-value pairs of the determined partition into different subsets using a new mapping function, and copies 335 each subset of the key-value pairs to a corresponding smaller partition. The determined partition can be used to serve a request from a client device to access one or more key-value pairs stored in the determined partition, while each subset of the key-value pairs are copied to a corresponding smaller partition.

In one aspect, the server manager 120 may receive a request from a client device to add one or more of the key-value pairs stored in the determined partition, while subsets of the key-value pairs of the determined partition are being copied to corresponding partitions. Responsive to receiving a request to add one or more key-value pairs stored in the determined partition, the server manager 120 adds 340 new key-value pairs to an existing partition (i.e., determined partition) and one of the new partitions (i.e., smaller partitions). Preferably, the new key-value pairs are added to both existing partition and one or more of the new partitions through a single transaction (or a single command). The new partition for adding the new key-value pair is determined by the new mapping function. By adding the new key-value pairs to the existing partition and one or more of the new partitions through the single transaction, any inconsistencies between the determined partition and the new partitions in case of a system crash can be avoided. In one aspect, the determined partition is used to serve any read operations during the split operation. Thus, a request from the client device 110 to access one or more key-values pairs can be served, even during the repartitioning process. Once the repartitioning is complete, the old partition (i.e., determined partition) is removed 350 and is replaced by the new partitions.

Due to repartitioning, a size of each partition in the storage machine 130 is maintained below a predetermined storage level. Accordingly, when a new storage machine needs to be added, one or more partitions can be transferred to the new storage machine rather than transferring key by key. Transferring partitions are more time efficient than transferring key by key for a large partition. Hence, the new storage machine 130 can be added to the existing storage machines 130 in a time efficient manner.

Figure 4A:
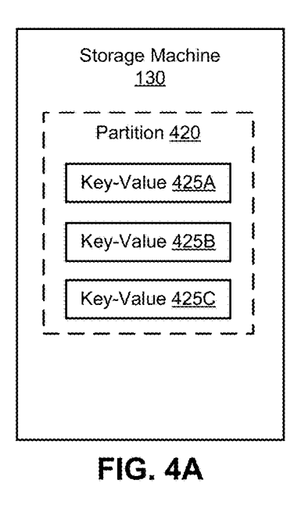
FIG. 4A illustrates an example partition stored at a distributed database before performing repartitioning in accordance with an embodiment.

FIGS. 4A through 4D illustrate an example process of performing repartitioning, according to one embodiment. In FIG. 4A, an example partition 420 comprises one or more key-value pairs. In this example, the key-value pairs 425A, 425B and 425C (generally "a key-value pair 425") are stored in a storage machine 130. In other examples, the storage machine 130 may include more partitions 420 or different number of key-value pairs 425.

Figure 4B:
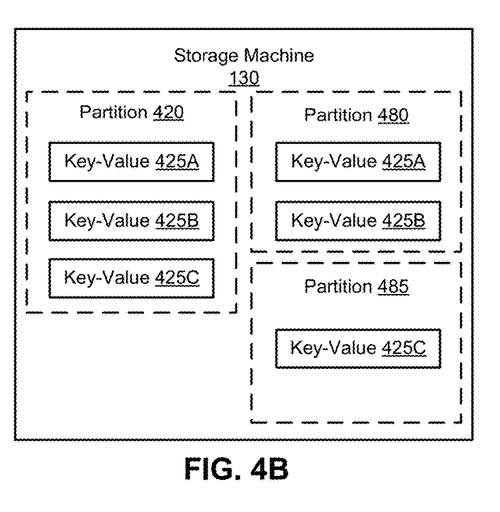
FIG. 4B illustrates smaller partitions of the partition shown in FIG. 4A during the repartitioning in accordance with an embodiment.

In FIG. 4B, smaller partitions 480 and 485 are added for performing repartitioning in accordance with an embodiment. The original partition 420 can be used to serve a request to access one or more of the key-value pairs 425A, 425B, and 425C, while the key-value pairs 425A, 425B, and 425C are copied to a respective partition. In this example, a first set of key-value pairs including the key-value pairs 425A and 425B is assigned to the smaller partition 480, and a second set of key-value pairs including the key-value pair 425C is assigned to the smaller partition 485. Accordingly, the key-value pairs 425A and 425B are copied to the partition 480, and the key-value pair 425C is copied to the partition 485.

Figure 4C:
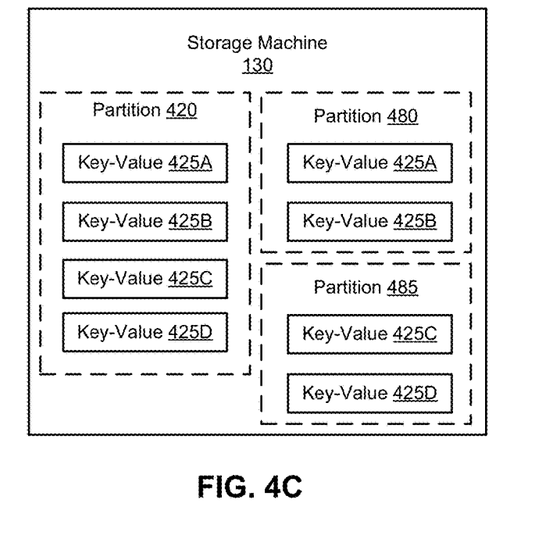
FIG. 4C illustrates an additional key-value pair added to the partitions shown in FIG. 4B during the repartitioning in accordance with an embodiment.

In FIG. 4C, a new key-value pair 425D is added to the partition 420 and the partition 485, during the repartitioning. The key-value pair 425D can be requested to be added by a client device 110, during the repartitioning. The request for adding the key-value pair 425D can be received, for example, when the key-value pair 425B is in the process of being copied to the respective partition 480, and the key-value pairs 425A, 425C are already copied to their respective partitions 480, 485. In one aspect, the key-value pair 425D is added to both the partition 420 and the smaller partition 485 through a single transaction.

After copying the first set of key-value pairs to the partition 480 and the second set of key-value pairs to the partition 485, the original partition 420 is removed. Although in FIG. 4D, two partitions 480 and 485 are generated for repartitioning the partition 420, in other examples, any number of smaller partitions may be generated for repartitioning the partition 420.

Figure 4D:
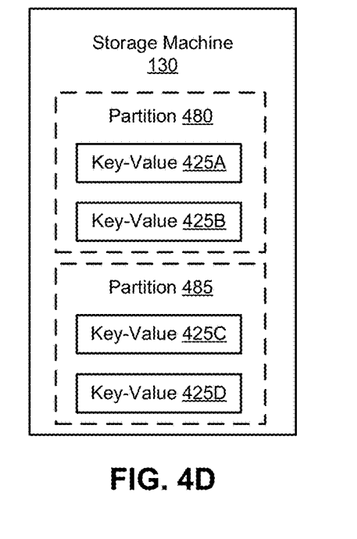
FIG. 4D illustrates example partitions after the repartitioning is completed in accordance with an embodiment.

Preferably, the repartitioning is proactively performed when an amount of requests to access or modify key-value pairs in the storage machine is expected to be low. Alternatively or additionally, the repartitioning is performed, responsive to detecting a size of a partition exceeding a predetermined storage level. Accordingly, a size of each of the partitions 480 and 485 is maintained within the predetermined storage level. Thus, in case a new storage machine is added later, one or more of the partitions 480 and 485 can be transferred in their entirety to the new storage machine rather than transferring key-value pairs individually. Also, a small partition (e.g., 1 Gigabyte) can be quickly transferred compared to a large partition (e.g., 10 Gigabytes). Accordingly, adding a new storage machine can be performed within 5 minutes compared to 20 hours in a conventional approach. Once a storage machine is added, some of the load (or partition) is transferred to the new machine in a time efficient manner. Moreover, multiple small partitions can be moved to the new machine to balance the load between the old machine and the new machine.

Computing Machine Architecture

Figure 5:
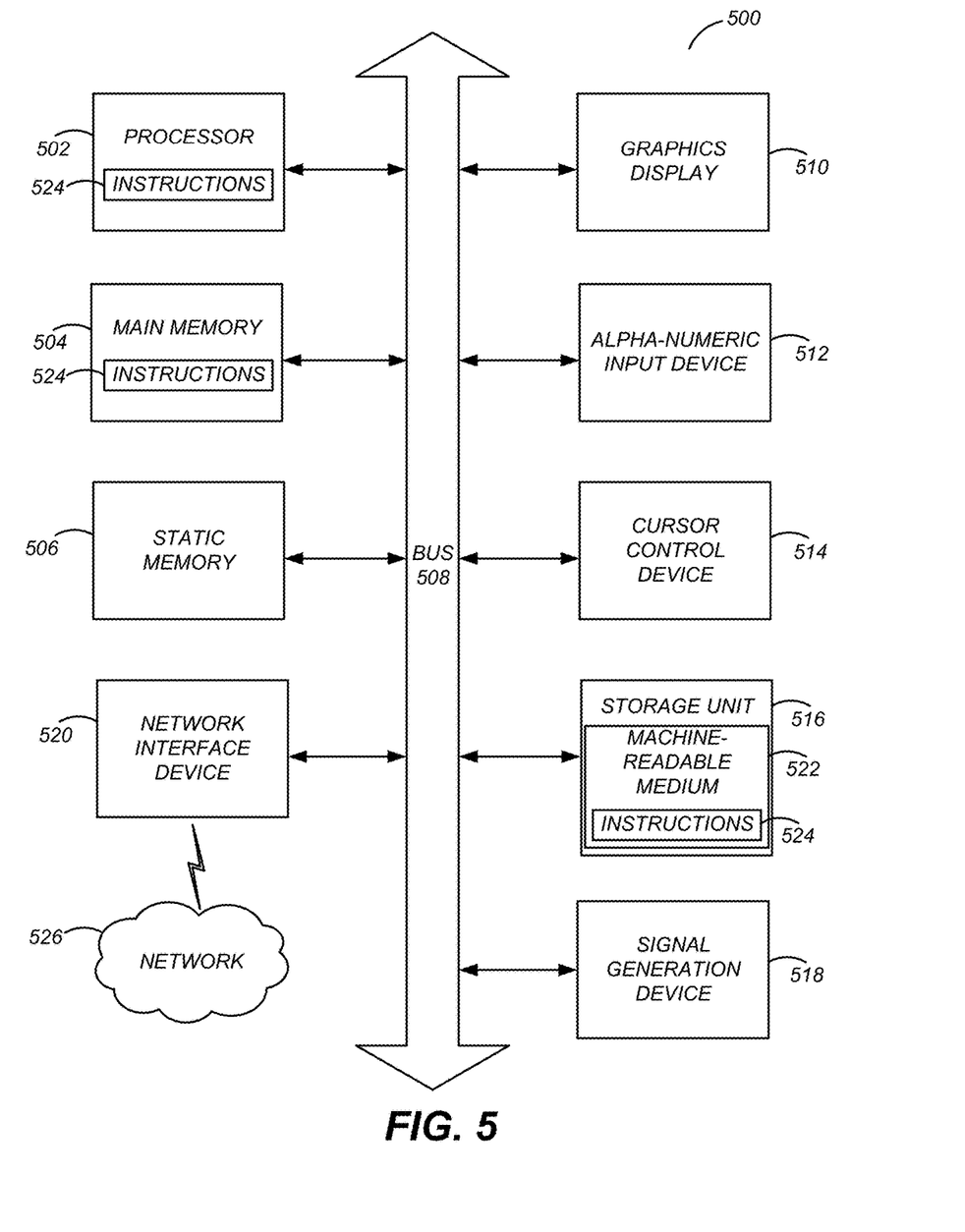
FIG. 5 illustrates components of an example machine able to read instructions from a machine-readable medium and execute them in a processor (or controller) in accordance with an embodiment.

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which instructions 524 (e.g., software or program code) for causing the machine to perform any one or more of the methodologies discussed herein, e.g., with FIGS. 1-4, may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processors (generally, processor 502) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include graphics display unit 510 (e.g., a plasma display panel (PDP), a liquid crystal display (LCD), a projector, or a cathode ray tube (CRT)). The computer system 500 may also include alphanumeric input device 512 (e.g., a keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

It is noted that although the configurations as disclosed are in the context of distributed database systems, the principles disclosed herein can be applied to other types of database systems. Advantages of the disclosed configurations include enabling access to a large volume of data (e.g., hundreds of Terabytes or even Petabytes), while the portion of the data stored in the database systems are being redistributed. The portion of the data is divided into subsets and the subsets are copied into respective one or more of new partitions. Accordingly, the portion of the data may be accessed, even during the redistribution. Moreover, by redistributing data, sizes of each partition stored at the database systems can be limited to a predetermined level, e.g., a few Megabytes. Hence, a new storage machine can be added in a short amount of time by transferring one or more of the redistributed partitions, while serving a large volume of data.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIG. 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process of repartitioning for load-balancing through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of repartitioning a plurality of partitions stored at a storage machine, the plurality of partitions comprising a plurality of key-value pairs, the method comprising:
   determining a partition from the plurality of partitions to split, the partition comprising a set of key-value pairs from the plurality of key-value pairs;
   generating smaller partitions, each of the smaller partitions smaller than the determined partition;
   generating a mapping function comprising hash values of keys of the plurality of key-value pairs that are assigned to the smaller partitions, each hash value assigned to a single smaller partition;
   performing a copying operation that copies each of subsets of the set of key-value pairs to a corresponding one of the smaller partitions in accordance with assignments specified in the mapping function;
   receiving a request to add a new key-value pair to the determined partition before the copying operation is completed, the new key-value pair comprising a new key whose hash value is not presented in the mapping function;
   updating the mapping function to include the hash value of the new key to assign to the hash value of the new key to one of the smaller partitions;
   adding the new key-value pair to the determined partition and the one of the smaller partitions through a single transaction, before the copying operation is completed.

2. The method of claim 1, further comprising:
   transferring one of the smaller partitions to a new storage machine.

3. The method of claim 1, further comprising:
   removing the determined partition, responsive to completing the copying operation.

4. The method of claim 3, further comprising:
   receiving a request to access one or more of the set of key-value pairs of the partition; and
   providing the access to the one or more of the key-value pairs of the partition while performing the copying operation.

5. The method of claim 1, wherein determining the partition to split comprises determining, among the plurality of partitions, the partition with a size exceeding a predetermined storage level.

6. The method of claim 1, further comprising:
   statistically determining a predicted time period at which an amount of requests from one or more client devices to access one or more of the key-value pairs is below a predetermined request level,
   wherein the copying operation is performed during the predicted time period.

7. A non-transitory computer readable medium storing instructions for repartitioning a plurality of partitions stored at a storage machine, the plurality of partitions comprising a plurality of key-value pairs, the instructions when executed by one or more processors cause the one or more processors to:
   determine a partition from the plurality of partitions to split, the partition comprising a set of key-value pairs from the plurality of key-value pairs;
   generate smaller partitions, each of the smaller partitions smaller than the determined partition;
   generate a mapping function comprising hash values of keys of the plurality of key-value pairs that are assigned to the smaller partitions, each hash value assigned to a single smaller partition;
   perform a copying operation that copies each of subsets of the set of key-value pairs to a corresponding one of the smaller partitions in accordance with assignments specified in the mapping function;
   receive a request to add a new key-value pair to the determined partition before the copying operation is completed, the new key-value pair comprising a new key whose hash value is not presented in the mapping function;
   update the mapping function to include the hash value of the new key to assign to the hash value of the new key to one of the smaller partitions;
   add the new key-value pair to the determined partition and the one of the smaller partitions through a single transaction, before the copying operation is completed.

8. The non-transitory computer readable medium of claim 7, wherein the instructions further cause the one or more processors to:
   transfer one of the smaller partitions to a new storage machine.

9. The non-transitory computer readable medium of claim 7, wherein the instructions further cause the one or more processors to:
   remove the determined partition, responsive to completing the copying operation.

10. The non-transitory computer readable medium of claim 9, wherein the instructions further cause the one or more processors to:
    receive a request to access one or more of the set of key-value pairs of the partition; and
    provide the access to the one or more of the key-value pairs of the partition while performing the copying operation.

11. The non-transitory computer readable medium of claim 7, wherein the instructions that cause the one or more processors to determine the partition to split further comprise instructions that cause the one or more processors to:
    determine, among the plurality of partitions, the partition with a size exceeding a predetermined storage level.

12. The non-transitory computer readable medium of claim 7, wherein the instructions further cause the one or more processors to:
    statistically determine a predicted time period at which an amount of requests from one or more client devices to access one or more of the key-value pairs is below a predetermined request level,
    wherein the copying operation is performed during the predicted time period.

13. A system for repartitioning a plurality of partitions stored at a storage machine, the plurality of partitions comprising a plurality of key-value pairs, the system comprising:
    one or more processors; and a memory comprising instructions executable by the one or more processors, the instructions when executed by the one or more processors cause the one or more processors to:
determine a partition from the plurality of partitions to split, the partition comprising a set of key-value pairs from the plurality of key-value pairs,
generate smaller partitions, each of the smaller partitions smaller than the determined partition,
generate a mapping function comprising hash values of keys of the plurality of key-value pairs that are assigned to the smaller partitions, each hash value assigned to a single smaller partition;
perform a copying operation that copies each of subsets of the set of key-value pairs to a corresponding one of the smaller partitions in accordance with assignments specified in the mapping function;
receive a request to add a new key-value pair to the determined partition before the copying operation is completed, the new key-value pair comprising a new key whose hash value is not presented in the mapping function;
update the mapping function to include the hash value of the new key to assign to the hash value of the new key to one of the smaller partitions;
add the new key-value pair to the determined partition and the one of the smaller partitions through a single transaction, before the copying operation is completed.

14. The system of claim 13, wherein the instructions further cause the one or more processors to:
transfer one of the smaller partitions to a new storage machine.

15. The system of claim 13, wherein the instructions further cause the one or more processors to:
remove the determined partition, responsive to completing the copying operation.

16. The system of claim 15, wherein the instructions further cause the one or more processors to:
receive a request to access one or more of the set of key-value pairs of the partition; and
provide the access to the one or more of the key-value pairs of the partition while performing the copying operation.

17. The system of claim 13, wherein the instructions that cause the one or more processors to determine the partition to split further comprise instructions that cause the one or more processors to:
determine, among the plurality of partitions, the partition with a size exceeding a predetermined storage level.

18. The system of claim 13, wherein the instructions further cause the one or more processors to:
statistically determine a predicted time period at which an amount of requests from one or more client devices to access one or more of the key-value pairs is below a predetermined request level,
wherein the copying operation is performed during the predicted time period.

* * * * *